United States Patent
Sato

(10) Patent No.: US 10,349,133 B2
(45) Date of Patent: Jul. 9, 2019

(54) NETWORK SYSTEM, RECEIVING APPARATUS, RECEIVING METHOD, RECORDING AND REPRODUCING APPARATUS, RECORDING AND REPRODUCING METHOD, PROGRAM, AND RECORDING MEDIUM

(71) Applicant: Saturn Licensing LLC, New York, NY (US)

(72) Inventor: Masahiko Sato, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 13/973,743

(22) Filed: Aug. 22, 2013

(65) Prior Publication Data

US 2013/0339994 A1    Dec. 19, 2013

Related U.S. Application Data

(63) Continuation of application No. 12/396,427, filed on Mar. 2, 2009, now Pat. No. 8,677,390.

(30) Foreign Application Priority Data

Mar. 5, 2008    (JP) .................................. 2008-054564

(51) Int. Cl.
*H04N 21/454*    (2011.01)
*H04L 12/28*    (2006.01)
(Continued)

(52) U.S. Cl.
CPC ....... *H04N 21/454* (2013.01); *H04L 12/2812* (2013.01); *H04N 5/4401* (2013.01);
(Continued)

(58) Field of Classification Search
None
See application file for complete search history.

(56) References Cited

U.S. PATENT DOCUMENTS 5,969,748 A * 10/1999 Casement .......... H04N 5/44543
                                            348/E5.105
5,973,683 A * 10/1999 Cragun ................. H04N 7/163
                                            348/E7.061
(Continued)

FOREIGN PATENT DOCUMENTS

| JP | 08-251121 | 9/1996 |
|---|---|---|
| JP | 2002-342291 | 11/2002 |

(Continued)

OTHER PUBLICATIONS

European Search Report in corresponding application No. EP 09 25 0484 (dated Jun. 3, 2009).
(Continued)

*Primary Examiner* — Cai Y Chen
(74) *Attorney, Agent, or Firm* — Oblon, McClelland, Maier & Neustadt, L.L.P.

(57) ABSTRACT

A network system includes a receiving apparatus for receiving contents, and a recording and reproducing apparatus for recording and reproducing the contents received by the receiving apparatus, the receiving apparatus and the recording and reproducing apparatus being interconnected via a network. The receiving apparatus includes a viewing age limit compliance information acquisition section, and a determination section. The recording and reproducing apparatus includes a storage section, and an address information delivery section.

16 Claims, 5 Drawing Sheets

(51) Int. Cl.
*H04N 5/44* (2011.01)
*H04N 5/781* (2006.01)
*H04N 21/41* (2011.01)
*H04N 21/436* (2011.01)
*H04N 21/442* (2011.01)
*H04N 21/84* (2011.01)
*H04N 21/45* (2011.01)
*H04N 5/775* (2006.01)

(52) U.S. Cl.
CPC ......... *H04N 5/781* (2013.01); *H04N 21/4135* (2013.01); *H04N 21/43622* (2013.01); *H04N 21/44231* (2013.01); *H04N 21/4532* (2013.01); *H04N 21/4542* (2013.01); *H04N 21/84* (2013.01); *H04N 5/775* (2013.01)

(56) References Cited

U.S. PATENT DOCUMENTS

| | | | | |
|---|---|---|---|---|
| 6,144,401 | A * | 11/2000 | Casement | H04N 5/44543 348/E5.105 |
| 7,788,689 | B2 | 8/2010 | Lee | |
| 2004/0103434 | A1* | 5/2004 | Ellis | H04N 5/44543 725/58 |
| 2005/0138193 | A1* | 6/2005 | Encarnacion et al. | 709/230 |
| 2005/0262751 | A1 | 12/2005 | Leslie | |
| 2006/0020784 | A1 | 1/2006 | Jonker et al. | |
| 2006/0136962 | A1 | 6/2006 | Masaki | |
| 2006/0262751 | A1* | 11/2006 | Vermola et al. | 370/331 |
| 2010/0287584 | A1* | 11/2010 | Starikov | H04N 7/163 725/28 |
| 2015/0350712 | A1* | 12/2015 | Sarosi | H04N 21/2747 725/28 |

FOREIGN PATENT DOCUMENTS

| | | |
|---|---|---|
| JP | 2003-186729 | 7/2003 |
| JP | 2005-275918 | 10/2005 |
| JP | 2006-238278 | 9/2006 |
| KR | 2005-095512 | 9/2005 |
| WO | WO 03/047204 | 6/2003 |

OTHER PUBLICATIONS

The Korean Intellectual Property Office, Patent Examination Bureau 3, Multimedia Broadcasting Examination Division, Office Action—Notification of Reasons for Refusal (dated Feb. 9, 2015).

* cited by examiner

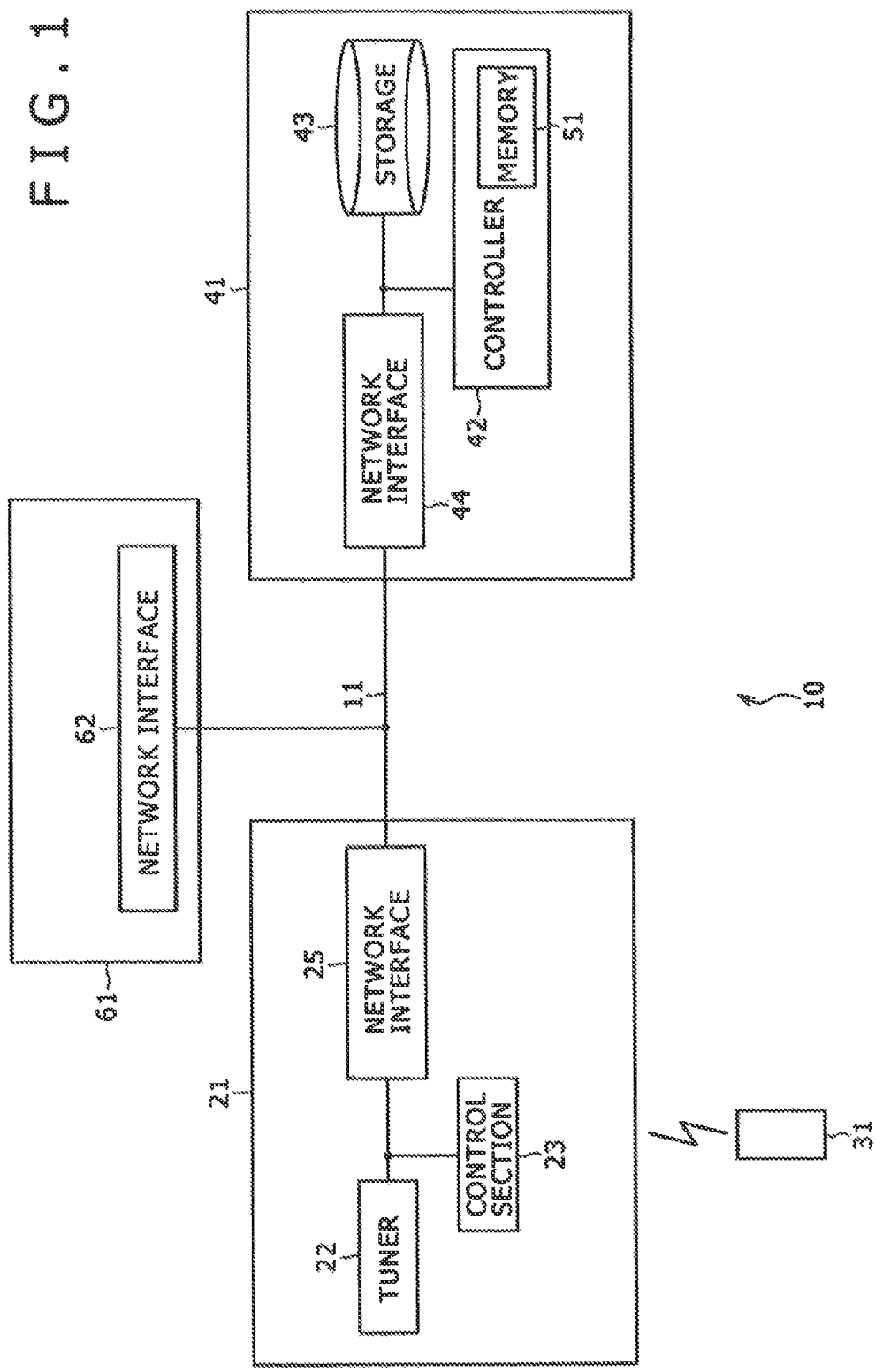

FIG.2

```
<root xmlns="urn:schemas-upnp-org:device-1-0">
<specVersion>
<major>1 </major>
<minor>0</minor>
</specVersion>
<URLBase>base URL for all relative URLs</URLBase>
<device>
<deviceType>urn:schemas-upnp-org:device:Basic:1</deviceType>
<friendlyName>short user-friendly title</friendlyName>
<manufacturer>name</manufacturer>
<manufacturerURL>URL to manufacturer site</manufacturerURL>
<modelDescription>long user-friendly title</modelDescription>
<modelName>model name</modelName>
<modelNumber>model number</modelNumber>
<modelURL>URL to model site</modelURL>
<serialNumber>manufacturer's serial number</serialNumber>
<UDN>uuid:UUID</UDN>
<UPC>Universal Product Code</UPC>
<parentalCont> yes </parentalCont>          ~101
<iconList>
<icon>
<mimetype>image/format</mimetype>
<width>horizontal pixels</width>
<height>vertical pixels</height>
<depth>color depth</depth>
<url>URL to icon</url>
</icon>
XML to declare other icons, if any, go here
</iconList>
<presentationURL>URL for presentation</presentationURL>
</device>
</root>
```

FIG.3

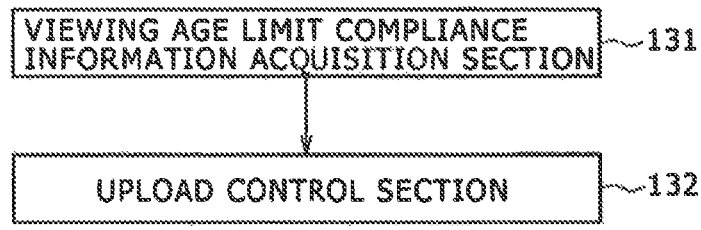

NETWORK SYSTEM, RECEIVING APPARATUS, RECEIVING METHOD, RECORDING AND REPRODUCING APPARATUS, RECORDING AND REPRODUCING METHOD, PROGRAM, AND RECORDING MEDIUM

CROSS REFERENCES TO RELATED APPLICATIONS

This is a continuation of U.S. patent application Ser. No. 12/396,427, filed Mar. 2, 2009, which claims priority under 35 U.S.C. § 119 of Japanese Patent Application No. JP 2008-054564, filed on Mar. 5, 2008, all of which are expressly incorporated herein by reference.

BACKGROUND OF THE INVENTION

1. Field of the Invention

The present invention relates to a network system, a receiving apparatus, a receiving method, a recording and reproducing apparatus, a recording and reproducing method, a program, and a recording medium. More particularly. The invention relates to a network system, a receiving apparatus, a receiving method, a recording and reproducing apparatus, a recording and reproducing method, a program, and a recording medium for having desired contents recorded with a sense of security.

2. Description of the Related Art

The number of television channels has multiplied in recent years and the contents of the programs broadcast over these channels have greatly diversified. Under these circumstances, each broadcasting station is offering program information specifying illustratively age-based viewing limits and minimum recommended ages for viewing. The information is intended to prevent, viewers under certain ages from watching broadcast programs containing violent or educationally undesirable scenes.

Illustratively, the input of a password is solicited when an attempt is made to record a broadcast program of which the viewing is subject to a viewing age limit. If the password is not input for authorization, a recording process may take place but neither sounds nor images are recorded. Japanese Patent Laid-open No. 2006-238278 discloses a technique whereby the recording of a broadcast program of which the viewing is denied because of a viewing age limit is halted if attempted.

The recent years have witnessed the widespread use of technologies for interconnecting personal computers, their peripherals, audio-visual equipment, telephones, home electrical appliances and the like on a network in the household and for allowing the networked devices to share their functions. Diverse technical specifications for bringing about such interconnecting networks have been proposed. As part of the effort for implementing household interconnectedness, a set of technical specifications known as UPnP (Universal Plug and Play) has been proposed.

UPnP is based on standardized technologies supporting the Internet and aims to let devices and apparatuses start to function when they are simply connected to the network, with no complicated operations or settings required. Illustratively under UPnP, a content received by a receiver connected to a network may be recorded by a recorder also on the network.

More specifically, the content received by the receiver is recorded by the recorder using an action called "Create Object" stipulated by UPnP. Then an "http-post" process defined by UPnP is executed, causing the data of the content to be sent to a predetermined URL. In this manner, the data of the content received by the receiver is uploaded to and recorded by the recorder.

The receiver connected to the network is capable of receiving contents and their descriptive data. Illustratively, according to the EN 300 468 standard stipulated by ETSI (European Telecommunications Standards Institute), a predetermined "Parental rating descriptor" may be inserted into program information "Event Information Table (FIT)" constituting viewing age limit information that may be transmitted along with contents.

Upon receipt of viewing age limit information (e.g., minimum recommended age) together with the content, the receiver detects the viewing age limit and, if necessary, requires the input of a previously registered personal identification number. The viewing of the content is thus limited in a controlled manner.

SUMMARY OF THE INVENTION

However, where the content received by the receiver connected to a network is uploaded to a recorder on the same network for recording, there is no guarantee that the destination recorder detects the viewing age limit information in the same manner as the receiver and requires the input of a previously registered personal identification number as needed. As a result, children might view the recorded content that is not destined for the children under a certain age.

The present invention has been made in view of the above circumstances and provides arrangements whereby any content can be recorded with a sense of security.

In carrying out the present invention and according to one embodiment thereof, there is provided a network system including: a receiving apparatus for receiving contents; and a recording and reproducing apparatus for recording and reproducing the contents received by the receiving apparatus, the receiving apparatus and the recording and reproducing apparatus being interconnected via a network. The receiving apparatus includes a viewing age limit compliance information acquisition section configured to acquire, when getting the recording and reproducing apparatus to record a content subject to a viewing age limit, from the recording and reproducing apparatus viewing age limit compliance information indicating whether or not the recorded content is controlled to be reproduced by the recording and reproducing apparatus in compliance with the viewing age limit, and a determination section configured to determine whether or not to have the received content recorded by the recording and reproducing apparatus based on the acquired viewing age limit compliance information. The recording and reproducing apparatus includes: a storage section configured to store the viewing age limit compliance information, and an address information delivery section configured to deliver, onto the network, address information identifying the location at which the viewing age limit compliance information is stored in the storage section.

According to the above-outlined network system, when getting the recording and reproducing apparatus to record a content subject to a viewing age limit, the receiving apparatus acquires from the recording and reproducing apparatus viewing ape limit compliance information indicating whether or not the recorded content is controlled to be reproduced by the recording and reproducing in compliance with the viewing age limit. Based on the acquired viewing age limit compliance information, the receiving apparatus determines whether or not to have the received content recorded by the recording and reproducing apparatus. The recording and reproducing apparatus stores the viewing age limit compliance information, and delivers, onto the network, address information identifying the location at which the viewing age limit compliance information is stored.

According to another embodiment of the present invention, there is provided a receiving apparatus which is connected via a network to a recording and reproducing apparatus for recording and reproducing contents and which receives the contents to be recorded by the recording and reproducing apparatus, the receiving apparatus including: a viewing age limit compliance information acquisition section configured such that, when getting the recording and reproducing apparatus to record a content subject to a viewing age limit, the viewing age limit compliance information acquisition section acquires from the recording and reproducing apparatus viewing age limit compliance information indicating whether or not the recorded content is controlled to be reproduced by the recording and reproducing apparatus in compliance with the viewing age limit; and a determination section configured to determine whether or not to have the received content recorded by the recording and reproducing apparatus based on the acquired viewing age limit compliance information.

Preferably, by communicating with the recording and reproducing apparatus over the network under protocols stipulated by a standard known as UPnP which stands for Universal Plug and Play, the viewing age limit compliance information acquisition section may acquire the viewing ago limit compliance information in accordance with the protocols.

Preferably, the viewing age limit compliance information may be defined by UPnP and described by predetermined tags inside device description information held by the recording and reproducing apparatus.

Preferably, the receiving apparatus may store information for identifying the recording and reproducing apparatus; and when storing the information for identifying the recording and reproducing apparatus, the receiving apparatus may acquire and store address information for identifying the location at which the viewing age limit compliance information is stored inside the recording and reproducing apparatus.

According to a further embodiment of the present invention, there is provided a receiving method for use with a receiving apparatus which is connected via a network to a recording and reproducing apparatus for recording and reproducing contents and which receives the contents to be recorded by the recording and reproducing apparatus. The receiving method includes the steps of: when getting the recording and reproducing apparatus to record a content subject to a viewing age limit, acquiring from the recording and reproducing apparatus viewing age limit compliance information indicating whether or not the recorded content is controlled to be reproduced by the recording and reproducing apparatus in compliance with the viewing age limit; and determining whether or not to have the received content recorded by the recording and reproducing apparatus based on the acquired viewing age limit compliance information.

According to an even further embodiment of the present invention, there is provided a program including a steps of causing a computer to function as a receiving apparatus which is connected via a network to a recording and reproducing apparatus for recording and reproducing contents and which receives the contents to be recorded by the recording and reproducing apparatus. The receiving apparatus includes: a viewing age limit compliance information acquisition section configured such that, when getting the recording and reproducing apparatus to record a content subject to a viewing age limit, the viewing age limit compliance information acquisition section acquires from the recording and reproducing apparatus viewing age limit, compliance information indicating whether the recorded content is controlled to be reproduced by the recording and reproducing apparatus in compliance with the viewing age limit; and a determination section configured to determine whether or not to have the received content recorded by the recording and reproducing apparatus based on the acquired viewing age limit compliance information.

According to the above-outlined receiving apparatus, receiving method or program, when the recording and reproducing apparatus records a content subject to a viewing age limit, the viewing age limit compliance information indicating whether or not the recorded content is controlled to be reproduced by the recording and reproducing apparatus in compliance with the viewing age limit is acquired from the recording and reproducing apparatus. It is then determined whether or not to have the received content recorded by the recording and reproducing apparatus based on the acquired viewing age limit, compliance information.

According to a still further embodiment of the present invention, there is provided a recording and reproducing apparatus which is connected via a network to a receiving apparatus for receiving contents and which records and reproduces the contents received by the receiving apparatus. The recording and reproducing apparatus includes a storage section configured such that, when the receiving apparatus receives a content subject to a viewing age limit, the storage section stores viewing age limit compliance information for determining whether or not to control the recording and reproducing apparatus to record the received content; and an address information delivery section configured to deliver, onto the network, address information identifying the location at which the viewing age limit compliance information is stored in the storage section.

Preferably, the viewing age limit compliance information may be defined, by UPnP and described by predetermined tags inside device description information.

According to a yet further embodiment of the present invention, there is provided a recording and reproducing method for use with a recording and reproducing apparatus which is connected via a network to a receiving apparatus for receiving contents and which records and reproduces the contents received by the receiving apparatus. The recording and reproducing method includes the steps of: when the receiving apparatus receives a content subject to a viewing age limit, storing viewing age limit compliance information for determining whether or not to control the recording and reproducing apparatus to record the received content; and delivering, onto the network, address information identifying the location at which the viewing age limit compliance information is stored in the storage section.

According to another embodiment of the present invention, there is provided a program including a steps of causing a computer to function as a recording and reproducing apparatus which is connected via a network to a receiving apparatus for receiving contents and which records and reproduces the contents received by the receiving apparatus. The recording and reproducing apparatus includes: a storage section configured such that, when the receiving apparatus receives a content subject to a viewing age limit, the storage section stores viewing age limit compliance information for determining whether or not to control the recording and reproducing apparatus to record the received content; and an address information delivery section configured to deliver, onto the network, address information identifying the location at which the viewing age limit compliance information is stored in the storage section.

According to the above-outlined recording and reproducing apparatus, recording and reproducing method or program, when the receiving apparatus receives a content subject to a viewing age limit, the viewing age limit compliance information for determining whether or not to control the recording and reproducing apparatus to record the received content in compliance with the viewing age limit is stored into the storage section. Then address information identifying the location at which the viewing age limit compliance information is stored in the storage section is delivered onto the network.

When the present invention is embodied and implemented as outlined above, any content can be recorded with a sense of security.

BRIEF DESCRIPTION OF THE DRAWINGS

Further objects and advantages of the present invention will become apparent upon a reading of the following description and appended drawings in which:

FIG. 1 is a block diagram showing a typical configuration of a network system embodying the present invention;

FIG. 2 is a tabular view showing an example of XML statements stored in a memory of a recorder constituting part of the embodiment in FIG. 1;

FIG. 3 is a block diagram showing a typical functional structure of software executed by a control section constituting part of the embodiment in FIG. 1;

DETAILED DESCRIPTION OF THE PREFERRED EMBODIMENTS

Figure 4:
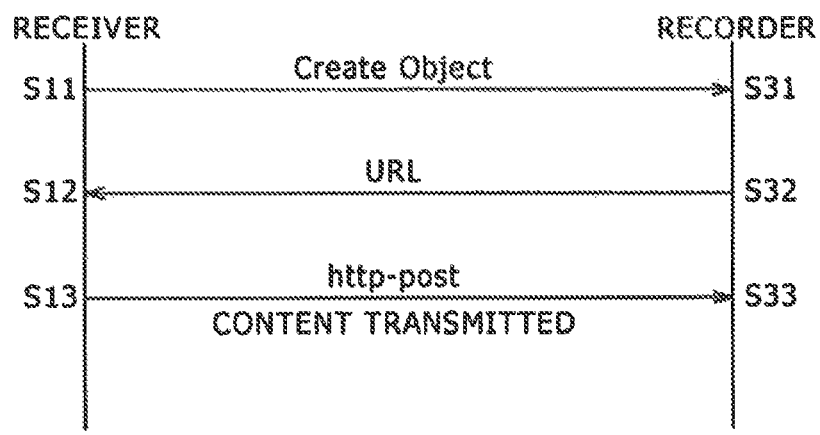
FIG. 4 is an arrow diagram of typical steps in which a content is uploaded in a manner stipulated by UPnP.

The preferred embodiments of the present invention will now be described in reference to the accompanying drawings. FIG. 1 is a block diagram showing a typical configuration of a network system 10 embodying the present invention. The network system 10 is illustratively composed of apparatuses that comply with the specifications of UPnP (Universal Plug and Play).

In the configuration of FIG. 1, the network system 10 has a receiver 21, a recorder 41, and a television set 61 interconnected with one other via a network 11. The network 11 may illustratively be a local area network such as the Ethernet (registered trademark).

The network system 10 is typically capable of having contents viewed or recorded using the receiver 21, recorder 41, and television set 61. For example, the user of the network system 10 may view desired broadcast programs on the television set 61 or have these programs recorded by the recorder 41 by making suitable operations on the receiver 21 using a remote controller 31 or the like. Where a broadcast program is to be recorded, the recorder 41 does not directly record the program in question. It is assumed instead that the receiver 21 first receives the broadcast program and the recorder 41 then records the program that has been received by the receiver 21.

More specifically, the content received by the receiver 21 is recorded by the recorder 41 as follows: between the receiver 21 and the recorder 41, an object is first created using an action "CreateObject" stipulated by UPnP. A process "http-post" defined by UPnP is then carried out so as to send the content data to a predetermined URL. This causes the content data received by the receiver 21 to be uploaded to the recorder 41 and recorded by the latter.

In practice, on the network system 10, the content is recorded when the data (i.e., content data) is uploaded from the receiver 21 to the recorder 41. Where contents are to be transmitted under UPnP, two types of equipment are involved: a media server that provides content data, and a control point that functions as a control point (i.e., control terminal equipment). In the content recording process involving data upload over the network system 10, the recorder 41 acts as the media server and the receiver 21 serves as the control point.

The receiver 21 is typically structured as a set-top box (STB) that contains a tuner 22. Illustratively the tuner 22 receives and decodes digital broadcast signals making up the content data that has been compression-encoded as per a predetermined compression encoding scheme such as MPEG-2. After decoding the digital broadcast signals into video and audio data, the receiver 21 sends the resulting data as needed onto the network 11 as the content data.

The receiver 21 further includes a control section 23 and a network interface 25. The control section 23 illustratively contains a processor and a memory and controls the components of the receiver 21 in keeping with preinstalled programs or the like. As needed, the control section 23 decodes the received content data and outputs the decoded data.

The network interface 25 delivers onto the network 11 the data coming from the tuner 22 or from the control section 23 over an internal bus or through other suitable routes inside the receiver 21. The network interface 25 also receives data placed onto the network 11, and forwards the received data onto the internal bus or the like in the receiver 21.

The recorder 41 is typically made up of a HDD (hard disk drive) recorder or a DVD (digital versatile disk) recorder. When recording broadcast programs (i.e., contents), the recorder 41 receives the data of the contents sent by the receiver 21 and records the received data content to an internal storage 43. The storage 43 is illustratively constituted by a HDD or a DVD drive.

The recorder 41 also includes a controller 42 and a network interface 44. The controller 42 contains a processor and a memory, and controls the components of the recorder 41 in accordance with preinstalled programs or the like. As needed, the controller 42 decodes the content data recorded in the storage 43 and outputs the decoded data.

The network interface 44 delivers onto the network 11 the data coming from the controller 42 or from the storage 43 over an internal bus or through other suitable routes inside the recorder 41. The network interface 44 also receives data placed onto the network 11 and forwards the received data onto the internal bus or the like inside the recorder 41.

The television set 61 receives through a network interface 62 the content data such as video and audio data supplied from the receiver 21 or from the recorder 41 over the network 11. The television set 61 displays on its display unit the images corresponding to the video data received through the network interface 62 and outputs through speakers the sounds corresponding to the audio data also received via the network interface 62.

Although FIG. 1 shows only the receiver 21, recorder 41 and television set 61 connected to the network 11, this is not limitative of the present invention. Alternatively, the network system 10 may be constituted by a plurality of recorders and a plurality of television sets connected to the network 11.

On the network system 10, the content data received by the receiver 21 is data which is created in accordance with the EN 300 468 standard stipulated by ETSI (European Telecommunications Standards Institute). According to the EN 300 468 standard under ETSI, a predetermined "Parental rating descriptor" may be inserted into program content) information "Event Information Table (FIT)" constituting viewing age limit information that may be transmitted along with contents. That is, the content data received by the receiver 21 is furnished beforehand with the viewing age limit information (e.g., age-based viewing limits and minimum recommended ages for viewing).

The above-mentioned. "Paxental rating descriptor" is discussed in detail in 6.2.26 of the EN 390 468, and the program information "Event Information Table (EIT)" is described in detail in 5.2.4 of the EN 300 468.

When the television set 61 is to receive for viewing the content furnished with viewing age limit information (i.e., content subject to a viewing age limit), the control section 23 of the receiver 21 detects illustratively the above-mentioned "Parental rating descriptor." As needed, the control section 23 causes the television set 61 to output on its display unit a message prompting the user to input a personal identification number. When the user inputs the same personal identification number as that registered beforehand in the receiver 21 using the remote controller 31 or the like, the content data received by the receiver 21 is decoded and forwarded to the television set 61.

In the manner described above, children who do not know the identification number are denied watching contents subject to viewing age limits on the network system 10. Adults who know the personal identification number have normal access to such contents without regard to age limit constraints.

However, when the content received by the receiver 21 connected to the network 11 is to be recorded by the recorder 41, there is no guarantee that the recorder 41 detects the viewing age limit information in the same manner as the receiver 21 and requires the input of a previously registered personal identification number as needed. As a result, children might view the recorded content that is not destined for the children under a certain age.

The above bottleneck is bypassed by the present embodiment with the following arrangement: the receiver 21 determines whether or not the recorder 41 is capable of such processes as detecting viewing age limits and requesting the input of a previously registered personal identification number as needed. In other words, the receiver 21 detects whether or not the recorder 41 can control content reproduction in compliance with viewing age limits. If the recorder 41 is found incapable of controlling content reproduction based on the viewing age limits, the receiver 21 does not upload any content data furnished with viewing age limit information.

According to this embodiment, the information for the recorder 41 about whether or not it can control content reproduction in compliance with viewing age limits (this information may be called viewing age limit compliance information where appropriate) is included illustratively in the information called "Device Description" stipulated by UPnP as information defining the device type. The Device Description is disclosed in detail in the document titled "Basic: 1.0 Device Definition Version 1.0 For UPnE™ Version 1.0" issued by UPnP FORUM, an organization that drafts and establishes the UPnP specifications and related requirements.

FIG. 2 is a tabular view showing an example of Device Description written in XML statements. With the present embodiment, tags denoting the viewing age limit compliance information of the recorder 41 are inserted into the Device Description in XML statements. In the example of FIG. 2, the tags representing the viewing age limit compliance information are inserted in an area 101 (shown in a rectangle) as part of the Device Description in XML statements.

In the area 101 of FIG. 2 is a description "<parentalCont>yes</parentalCont>" which represents viewing age limit compliance information using tags <parentalCont>. The middle part "yes" in the area 101 designates whether or not content reproduction is controlled by The recorder 41 in compliance with viewing age limits. The entry "yes" means that the recorder 41 is capable of controlling content reproduction in compliance with viewing age limits.

If the recorder 41 is a device incapable of controlling content reproduction in compliance with viewing age limits, then the area 101 in FIG. 2 has a description "<parentalCont>no</parentalCont>" entered therein.

The Device Description above in XML statements is stored illustratively in an internal memory 51 inside the controller 42 of the recorder 41. Typically, the Device Description is written to the memory 51 when the recorder 41 is shipped from the factory.

As needed, the recorder 41 delivers onto the network 11 the URL (uniform resource locator) of address information identifying the location at which the Device Description is stored in the memory 51. Illustratively, when the recorder 41 is connected to the network 11 and activated, the recorder 41 multicasts this URL over the network 11 in accordance with a protocol called SSDP (Simple Service Discover Protocol) under UPnP. At this point, the URL of the address information identifying the location at which the Device Description stored is transmitted in addition to information identifying the recorder 41 to other UPnP-compatible apparatuses (e.g., receiver 21) connected to the network 11. The details of SSDP are disclosed illustratively in the document titled "UPnP Device Architecture 1.0" issued by UPnP FORUM.

Alternatively, at the time when the receiver 21 is operated to register recorders capable of recording content data, the URL of the Device Description in the recorder 41 may be multicast in accordance with the above-mentioned SSDP in the direction of the receiver 21.

According to the present embodiment, as described, predetermined tags are inserted in the Device Description to describe the viewing age limit compliance information. This arrangement makes it possible to designate whether or not the recorder 41 is capable of such processes as detecting viewing age limits and requesting the input of a previously registered personal identification number if necessary, with no need to add special functions to the receiver 21 or recorder 41 or to get them to execute special processes.

FIG. 3 is a block diagram showing a typical functional structure of software such as programs executed by the control section 23 of the receiver 21. In FIG. 3, a viewing age limit compliance information acquisition section 131 acquires the viewing age limit compliance information of the recorder 41.

Illustratively, when the above-mentioned SSDP-based multicast operation is performed, the viewing age limit compliance information acquisition section 131 acquires the URL of the multicast packet coming from another apparatus (e.g., recorder 41). The viewing age limit compliance information acquisition section 131 proceeds to store the obtained URL in association with an ID or the like identifying the multicasting apparatus. As needed, the viewing age limit compliance information acquisition section 131 accesses the acquired URL to obtain the viewing age limit compliance information of the apparatus in question and stores the obtained information in conjunction with the ID identifying that apparatus. Typically, the ID for identifying the apparatus of interest may be its IP address. The viewing age limit compliance information acquisition section 131 controls the receiver 21 in such a manner that the latter will, carry out the above-described processes as described.

An upload control section 132 controls uploading of content data to the recorder 41 illustratively based on preset reservations or on the commands input by use of a remote controller.

The upload control section 132 typically performs the action "CreateObject" stipulated by UPnP. Upon receipt of the action "CreateObject," the recorder 41 sends to the receiver 21 a URL denoting the storage area for accommodating content data. Thereafter, the upload control section 132 carries out the process "http-post" defined by UPnP to transmit the content data to the URL that has been received.

The content upload process stipulated by UPnP is described below in reference to the arrow diagram of FIG. 4. In the example of FIG. 4, the receiver 21 acting as a control point is shown uploading a content to the recorder 41 serving as a media server.

In step S11, the receiver 21 performs the action "CreateObject" stipulated by UPnP. The operation causes information, described in XML to be sent to the recorder 41. In step S31, the recorder 41 receives the transmitted information.

After receiving the action "CreateObject" in step S31, the recorder 41 goes to step S32 and sends to the receiver 21 the URL denoting the storage area for storing content data. In step S12, the receiver 21 receives the URL.

In step S13, the receiver 21 carries out the process "http-post" defined by UPnP in order to send the content data to the URL that was received in step S12.

In step S33, the recorder 41 receives the content data sent by the receiver 21 in step S13. The received content data is stored into the storage 43.

In the steps described above, the receiver 21 (control point) uploads the content to the recorder 41 (media server). Before starting the uploading process, the upload control section 132 determines whether or not the recorder 41 is capable of controlling content reproduction in compliance with the viewing age limit based on the viewing age limit compliance information obtained by the viewing age limit compliance information acquisition section 131. Only if the recorder 41 is found capable of content reproduction in compliance with the view age limit, does the receiver 21 upload the content data as discussed above. The upload control section 132 controls the receiver 21 in such a manner that the latter will effect the above-described processes as described.

Figure 5:
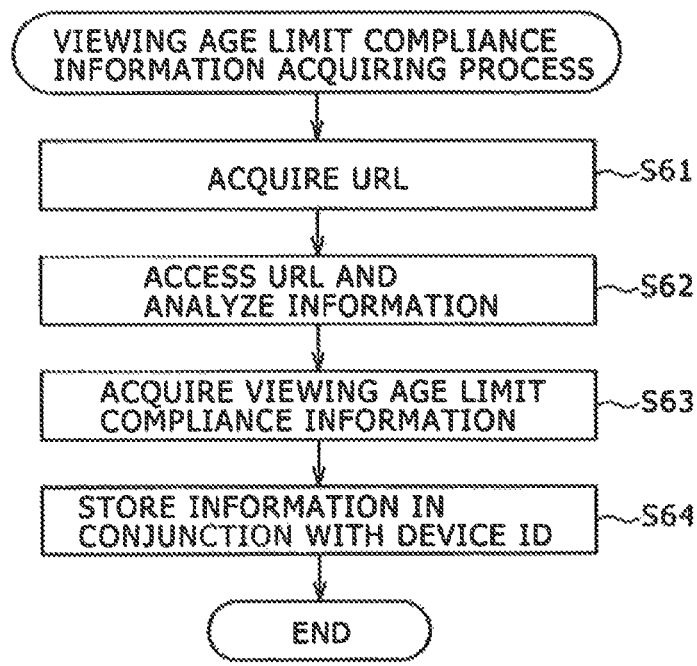
FIG. 5 is a flowchart of typical steps constituting a viewing age limit compliance information acquiring process.

Described below in reference to the flowchart of FIG. 5 is the viewing age limit compliance information acquiring process performed by the receiver 21. This process is carried out typically when the recorder 41 is connected to the network 11 and operated in normal mode. Alternatively, the process may be executed in conjunction with the user's operations for registering a recorder capable of recording content data to the receiver 21.

In step S61, the viewing age limit compliance information acquisition section 131 obtains the URL contained in the above-mentioned SSDP-compatible multicast packet coming illustratively from the recorder 41. The viewing age limit compliance information acquisition section 131 stores the acquired URL in combination with an ID or the like identifying the packet-sending apparatus.

As mentioned above, the URL may be multicast over the network 11 in accordance with the protocol called SSDP when the recorder 41 is connected to the network 11 and activated. Alternatively, the URL may be multicast as per SSDP in conjunction with the user's operations for registering the recorder capable of recording content data to the receiver 21. In any case, it is assumed that prior to step S61, the recorder 41 sends out the URL of the address information identifying the location at which is stored the above-mentioned Device Description or like specifics.

In step S62, the viewing age limit compliance information acquisition section 131 gains access to the URL obtained in step S61, and analyzes the information found at the URL regarding the device type or like specifics. The information analyzed at this point is typically the Device Description discussed above in connection with FIG. 2

In step S63, the viewing age limit compliance information acquisition section 131 acquires viewing age limit compliance information. Illustratively, what is acquired at this point is the viewing age limit compliance information of the recorder 41 described using the tags <parentalCont> in the area 101 of FIG. 2.

In step S64, the viewing age limit compliance information acquisition section 131 stores the viewing age limit compliance information of the recorder 41 obtained in step S63, in conjunction with the ID or the like identifying the recorder 41.

In the steps described above, the viewing age limit compliance information of the recorder 41 is acquired and stored. If recording apparatuses other than the recorder 41 are connected to the network 11, the viewing age limit compliance information of these apparatuses is also obtained in like manner. The viewing age limit compliance information thus acquired is written to a suitable correspondence table associating the viewing age limit compliance information with the ID of each of the apparatuses involved, the table being stored illustratively in an internal memory of the control section 23.

In the example of FIG. 5, steps S61 through S64 are assumed to be carried out consecutively. Alternatively, following step S61, steps S62 through S64 may be performed as needed in a suitably timed manner.

Figure 6:
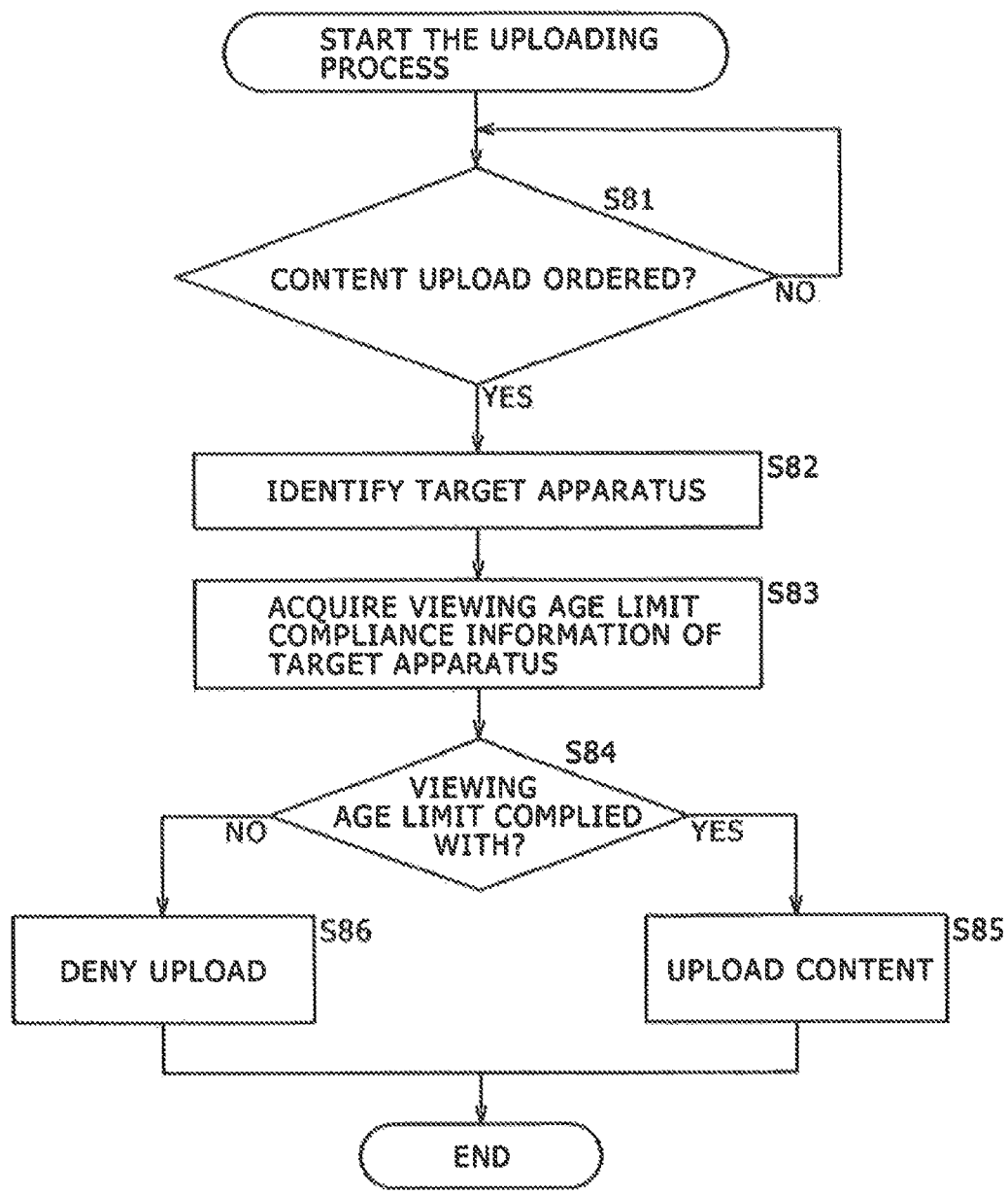
FIG. 6 is a flowchart of typical steps constituting an upload process.

Described below in reference to the flowchart of FIG. 6 is the uploading process performed by the receiver 21. This process is carried out illustratively when the receiver 21 is ordered, typically through the remote controller, to record a content subject to a viewing age limit. Alternatively, the process may be executed in conjunction with the user's operations for reserving such contents under viewing age constraints.

Whether or not the content to be recorded is a content subject to a viewing age limit is determined illustratively by the control section 23 of the receiver 21 detecting the above-mentioned "Parental rating descriptor."

In step S81, the upload control section 132 determines whether the uploading of a content is ordered. The upload control section 132 waits for the content upload to be ordered. Illustratively, the content upload is found to be ordered in step S81 if the time output by an internal timer of the control section 23 coincides with a preset recording reservation time, or if the recording is ordered to be carried out through the remote controller or the like. With the content upload found ordered in step S81, step S82 is reached.

in step S82, the upload control section 132 identifies the target apparatus to which to upload the content. It is assumed here that the recorder 41 is identified as the target apparatus.

In step S83, the upload control section 132 identifies the viewing age limit compliance information of the target apparatus. At this point, the upload control section 132 acquires the viewing age limit compliance information of the recorder 41 which was stored in step S64 of FIG. 5.

In step S84, the upload control section 132 determines whether the target apparatus can control content reproduction in compliance with the viewing age limit based on the viewing age limit compliance information obtained in step S83.

If in step S84 the target apparatus is found capable of controlling content reproduction in compliance with the viewing are limit, then step S85 is reached.

In step S85, the upload control section 132 uploads the content data to the target apparatus (i.e., recorder 41 in this case). In turn, the recorder 41 records the uploaded content data to its storage 43.

Where the content of interest is subject to the viewing age limit, the content data is uploaded together with "rating" information stipulated by the requirements "Content Directory 1: Service Template Version 1.01, Appendix B (p. 77)" under UPnP. If the recorder 41 is capable of controlling content reproduction in compliance with viewing age limits, then the recorder 41, given the "rating" information, prompts the user to input a personal identification number or to make some suitable operation as needed.

When the receiver 21 to which the present embodiment applied receives the content from which the above-mentioned "Parental rating descriptor" was detected and proceeds to get the content recorded by the recorder 41, the recorder 41 controls content reproduction unfailingly in compliance with the viewing age limit in effect. That is, as long as the inventive receiver 21 is used to record contents, those contents not intended for children will not be viewed inadvertently by them regardless of the contents having been recorded successfully or not.

If in step S84 the target apparatus is not found capable of controlling content reproduction in compliance with viewing age limits, then step S86 is reached.

In step S86, the upload control section 132 denies uploading the content. Specifically, the unavailability of recording is indicated by a message appearing on a message indicator or the like of the receiver 21. Obviously the content data is not uploaded and the storage 43 of the recorder 41 does not record the content data in question.

In the steps described above, the uploading of content data from the receiver 21 to the recorder 41 is controlled. The recorder 41 incapable of controlling content reproduction in compliance with viewing age limits will not receive any age-limited content data from the receiver 21. As a result, the content not destined for children will not be viewed inadvertently by them. The user is thus able to have any contents recorded with a sense of security.

In the foregoing paragraphs, the viewing age limit compliance information was shown written in the area 101 of FIG. 2 using the tags <parentalCont>, and the middle part "yes" in the area 101 was explained as indicative of whether the recorder 41 is capable of controlling content reproduction based on viewing age limits. Alternatively, the information identified by the tags <parentalCont> may be arranged to have different meanings.

For example, a description "<parentalCont>16</parentalCont>" may be placed in the area 101 of FIG. 2. In this example, the viewing age limit compliance information is expressed using the tags <parentalCont>, and the middle part "16" in the area 101 denotes the youngest age of the users allowed to watch the content recorded by the recorder 41. The entry "16" means that the users authorized to view the content recorded by the recorder 41 include those as young as 16 years of age.

In like manner, the contents not authorized for viewing by those under the age of 10 may be prevented from getting uploaded to the recorder 41. In another example, the contents not, allowed for viewing by those under the age of 15 may still be unloaded.

The foregoing description showed how the inventive arrangements work when the receiver 21 uploads contents to the recorder 41. Alternatively, this invention may also be applied when contents are downloaded by the recorder 41 from the receiver 21.

In the UPnP-stipulated content downloading process, a list of downloadable contents is presented together with URLs by the source apparatus (e.g., receiver 21) to the download destination apparatus (e.g., recorder 41). When the destination apparatus designates a desired URL and performs a process "http-get," the content in question is downloaded to the apparatus.

Where the present invention is applied to the process in which the recorder 41 downloads a content from the receiver 21, the receiver 21 upon receipt of a download request from the recorder 41 needs only determine whether or not to let the requested content be downloaded on the basis of the viewing age limit compliance information obtained.

Alternatively, upon receipt of the download request from the recorder 41, the receiver 21 may create a list of downloadable contents based on the viewing age limit compliance information. If the recorder 41 is found incapable of controlling content reproduction in compliance with viewing age limits based on the viewing age limit compliance information, then all contents subject to viewing age limits may be excluded from the downloadable content list that is presented to the recorder 41.

As described, in the downloading process as well as in the uploading process, any content not destined for children is prevented from being viewed inadvertently by them. The user is thus able to have all desired contents recorded with a sense of security.

The foregoing description was based on the assumption that the receiver 21 and recorder 41 are both UPnP-compatible apparatuses. However, the receiver 21 and recorder 41 need not be compatible with the UPnP specifications if the receiver 21 can reliably obtain the viewing age limit compliance information of the recorder 41 in predetermined steps.

The series of steps and processes described above may be executed either by hardware or by software. Where the software-based processing is to be carried out, the programs constituting the software may be either incorporated beforehand in dedicated hardware of a computer for program execution or installed upon use over a network or from a suitable recording medium into a general-purpose personal computer such as one in FIG. 7 capable of executing diverse functions based on the installed programs.

Figure 7:
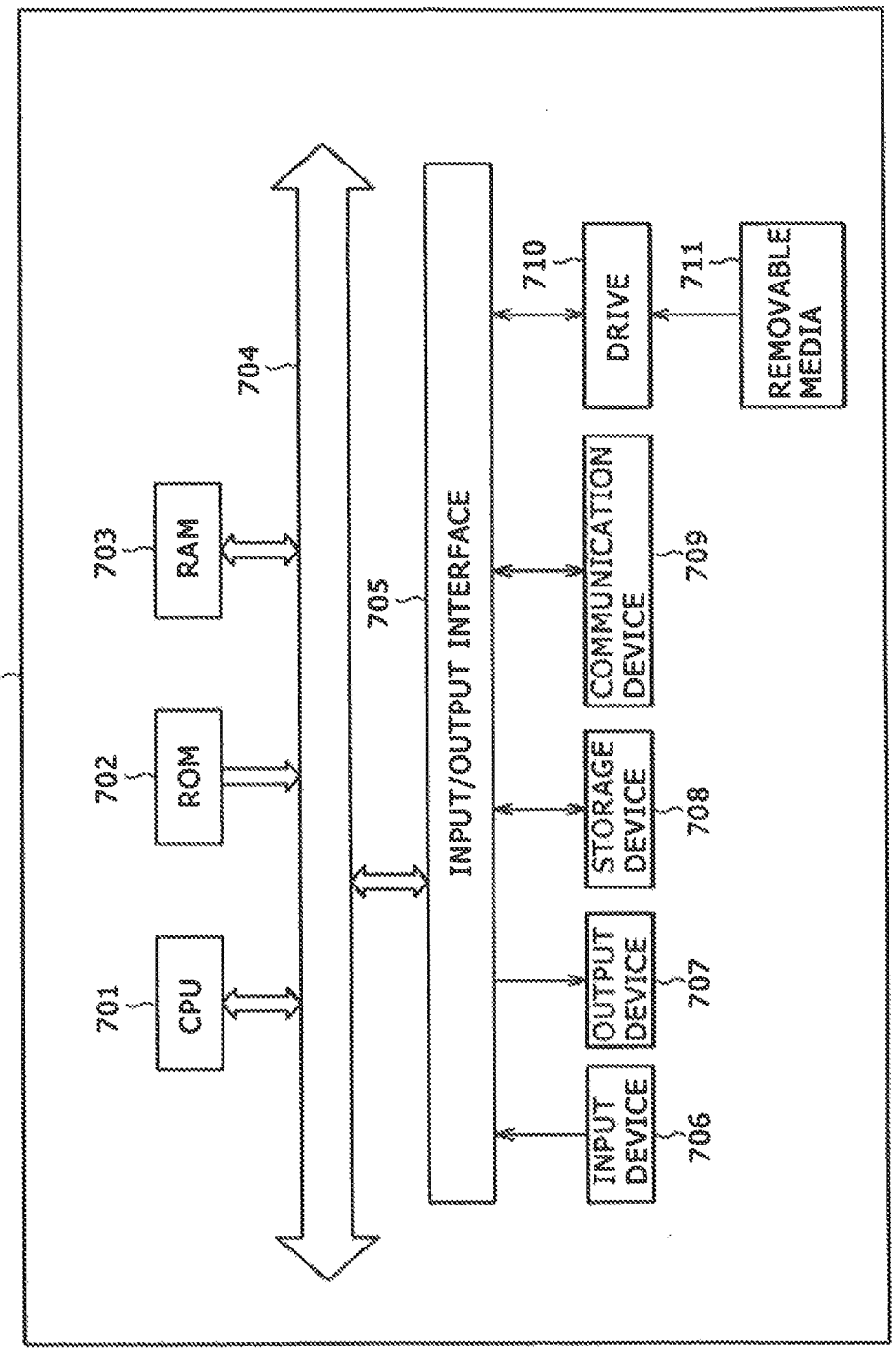
FIG. 7 is a block diagram showing a typical structure of a personal computer.

In the structure of FIG. 7, a CPU (central processing unit) 701 performs various processes in accordance with the programs held in a ROM (read only memory) 702 or in keeping with the programs loaded from a storage device 708 into a RAM (random access memory) 703. The RAM 703 may also accommodate data needed by the CPU 701 in carrying out its diverse processing.

The CPU 701, ROM 702, and RAM 703 are interconnected with one another by way of a bus 704. An input/output interface 705 is also connected to the bus 704.

The input/output interface 705 is further connected to an input device 706, an output device 707, the storage device 708, and a communication device 709. The input device 706 is typically made up of a keyboard and a mouse. The output device 707 is formed by a display such as a CRT (cathode ray tube) or an LCD (liquid crystal display) and by speakers. The storage device 708 is illustratively composed of a hard disk drive. The communication device 709 is typically constituted by a modem and a network interface card such as a LAN card. The communication device 709 conducts communications over networks including the Internet.

A drive 710 may be connected as needed to the input/output interface 705. A piece of removable media 711 such as a magnetic disk, an optical disk, a magneto-optical disk or a semiconductor memory may be loaded into the drive 710. Computer programs retrieved from the loaded removable medium may be installed as needed into the storage device 708.

Where the above-described processes or steps are to be performed by software, the program constituting the software are installed into the computer over networks such as the Internet or from an appropriate recording medium such as the removable media 711.

The recording medium is offered to users not only as the removable media 711 (shown in FIG. 7) apart from their computer or the like and constituted by magnetic disks (including floppy disks (registered trademark)), optical disks (including CD-ROM (compact disc-read only memory) and DVD (digital versatile disk)), magneto-optical disks (including MD (Mini-disc; trademark)), or semiconductor memory accommodating the programs of interest; but also in the form of the ROM 702 or the hard disk drive in the storage device 708 containing the programs and incorporated beforehand in the computer.

In this specification, the steps describing the programs to be executed represent not only the processes that are to be carried out in the depicted sequence (i.e., on a time series basis) but also processes that may be performed parallelly or individually and not chronologically.

It should be understood by those skilled in the art that various modifications, combinations, sub combinations and alterations may occur depending on design requirements and other factor in so far as they are within the scope of the appended claims or the equivalents thereof.

What is claimed is:

1. A receiving apparatus which is connected via a network to a recording and reproducing apparatus for recording and reproducing contents, the receiving apparatus being configured to receive the contents and to transmit the contents to said recording and reproducing apparatus, said receiving apparatus comprising:
a Central Processing Unit (CPU) configured to:
prior to transmitting content subject to an access condition to the recording and reproducing apparatus, receive device description information of the recording and reproducing apparatus;
access the device description information of the recording and reproducing apparatus and determine whether or not said recording and reproducing apparatus is capable of allowing or denying reproduction of the content in compliance with said access condition based on the device description information; and
transmit the content subject to the access condition to said recording and reproducing apparatus only if the determination indicates that the recording and reproducing apparatus is capable of allowing or denying the reproduction of the content in compliance with the access condition based on the device description information, such that the recording and reproducing apparatus allows or denies reproduction of the content in compliance with the access condition.

2. The receiving apparatus according to claim 1, wherein, by communicating with said recording and reproducing apparatus over said network under protocols stipulated by a standard known as UPnP which stands for Universal Plug and Play, said CPU is configured to receive a URL of the device description information of the recording and reproducing apparatus in accordance with said protocols.

3. The receiving apparatus according to claim 1, wherein said device description information is defined by UPnP and described by predetermined tags stored by said recording and reproducing apparatus.

4. The receiving apparatus according to claim 1, wherein said receiving apparatus is configured to:
store information for identifying said recording and reproducing apparatus, and
acquire and store, when storing said information for identifying said recording and reproducing apparatus, a URL for identifying a location at which said device description information is stored inside said recording and reproducing apparatus.

5. A receiving method for use with a receiving apparatus which is connected via a network to a recording and reproducing apparatus for recording and reproducing contents, the receiving apparatus being configured to receive the contents and to transmit the contents to said recording and reproducing apparatus, said receiving method comprising:
prior to transmitting content subject to an access condition to the recording and reproducing apparatus, receiving device description information of the recording and reproducing apparatus;
accessing the device description information of the recording and reproducing apparatus and determining whether or not said recording and reproducing apparatus is capable of allowing or denying reproduction of the content in compliance with said access condition based on the device description information; and
transmitting the content subject to the access condition to said recording and reproducing apparatus only if the determination indicates that the recording and reproducing apparatus is capable of allowing or denying the reproduction of the content in compliance with the access condition based on the device description information, such that the recording and reproducing apparatus allows or denies reproduction of the content in compliance with the access condition.

6. A recording and reproducing apparatus which is connected via a network to a receiving apparatus for receiving contents, the recording and reproducing apparatus being configured to receive the contents transmitted by said receiving apparatus, said recording and reproducing apparatus comprising:

a Central Processing Unit (CPU) configured to:
store device description information in a memory device for determining whether or not to transmit content subject to an access condition from the receiving apparatus to the recording and reproducing apparatus, wherein said device description information indicates whether or not said recording and reproducing apparatus is capable of allowing or denying reproduction of the content subject to the access condition in compliance with the access condition; and transmit, onto said network, said device description information stored in said memory device.

7. The recording and reproducing apparatus according to claim 6,
wherein said device description information is defined by UPnP which stands for Universal Plug and Play and described by predetermined tags.

8. A recording and reproducing method for use with a recording and reproducing apparatus which is connected via a network to a receiving apparatus for receiving contents, the recording and reproducing apparatus being configured to receive the contents transmitted by said receiving apparatus, said recording and reproducing method comprising:

storing device description information in a memory device for determining whether or not to transmit content subject to an access condition from the receiving apparatus to the recording and reproducing apparatus, wherein said device description information indicates whether or not said recording and reproducing apparatus is capable of allowing or denying reproduction of the content subject to the access condition in compliance with the access condition; and transmitting, onto said network, said device description information stored in said memory device.

9. The receiving apparatus according to claim 1, wherein the access condition is a viewing age and
the allowing or denying reproduction of the content subject to the access condition in compliance with the access condition includes requesting a password.

10. The receiving method according to claim 5, wherein the access condition is a viewing age limit, and
the allowing or denying reproduction of the content subject to the access condition in compliance with the access condition includes requesting a password.

11. The recording and reproducing apparatus according to claim 6, wherein
the access condition is a viewing age limit, and
the allowing or denying reproduction of the content subject to the access condition in compliance with the access condition includes requesting a password.

12. The recording and reproducing method according to claim 8, wherein
the access condition is a viewing age limit, and
the allowing or denying reproduction of the content subject to the access condition in compliance with the access condition includes requesting a password.

13. The receiving apparatus according to claim 1, wherein the CPU is further configured to
receive from the recording and reproducing apparatus a Uniform Resource Locator (URL) of the device description information of the recording and reproducing apparatus; and
access the URL to acquire the device description information of the recording and reproducing apparatus to determine whether or not said recording and reproducing apparatus is capable of allowing or denying reproduction of the content in compliance with said access condition.

14. The receiving method according to claim 5, further comprising:
receiving from the recording and reproducing apparatus a Uniform Resource :Locator (URL) of the device description information of the recording and reproducing apparatus; and
accessing the URL to acquire the device description information of the recording and reproducing apparatus to determine whether or not said recording and reproducing apparatus is capable of allowing or denying reproduction of the content in compliance with said access condition.

15. The recording and reproducing apparatus according to claim 6, wherein the CPU is further configured to transmit, onto the network, a URL identifying the location at which the device description information is stored in the memory device.

16. The recording and reproducing method according to claim 8, further comprising transmitting, onto the network, a URL identifying the location at which the device description information is stored in the memory device.

* * * * *